(12) United States Patent
Jain et al.

(10) Patent No.: US 11,610,020 B2
(45) Date of Patent: Mar. 21, 2023

(54) SECURING SENSITIVE USER DATA STORED LOCALLY BY AN APPLICATION

(71) Applicant: McAfee, LLC, Santa Clara, CA (US)

(72) Inventors: Shashank Jain, Bangalore (IN); Urmil Mahendra Parikh, Bangalore (IN); Dattatraya Kulkarni, Bangalore (IN); Srikanth Nalluri, Karnataka (IN)

(73) Assignee: McAfee, LLC, San Jose, CA (US)

( * ) Notice: Subject to any disclaimer, the term of this patent is extended or adjusted under 35 U.S.C. 154(b) by 243 days.

(21) Appl. No.: 16/887,676

(22) Filed: May 29, 2020

(65) Prior Publication Data

US 2021/0312077 A1     Oct. 7, 2021

(30) Foreign Application Priority Data

Apr. 7, 2020  (IN) .............................. 202041015290

(51) Int. Cl.
| | | |
|---|---|---|
| *G06F 21/62* | (2013.01) | |
| *G06F 21/60* | (2013.01) | |
| *G06F 21/57* | (2013.01) | |
| *G06F 21/46* | (2013.01) | |
| *G06F 21/56* | (2013.01) | |

(52) U.S. Cl.
CPC .......... *G06F 21/6245* (2013.01); *G06F 21/46* (2013.01); *G06F 21/566* (2013.01); *G06F 21/577* (2013.01); *G06F 21/602* (2013.01); *G06F 2221/033* (2013.01)

(58) Field of Classification Search
CPC .... G06F 21/6245; G06F 21/46; G06F 21/566; G06F 21/577; G06F 21/602; G06F 2221/033
See application file for complete search history.

(56) References Cited

U.S. PATENT DOCUMENTS

| | | | |
|---|---|---|---|
| 8,856,869 B1 | 10/2014 | Brinskelle | |
| 8,881,227 B2 | 11/2014 | Rajagopal et al. | |
| 9,838,384 B1 * | 12/2017 | Kane-Parry | ........... G06F 21/316 |
| 10,607,015 B1 * | 3/2020 | Hecht | ........................ G06F 9/54 |
| 11,113,389 B1 * | 9/2021 | Salehpour | ............. G06F 21/561 |
| 11,301,568 B1 * | 4/2022 | Dargude | ............... H04L 63/101 |
| 11,387,986 B1 * | 7/2022 | Ghetti | ..................... H04L 63/04 |
| 11,457,040 B1 * | 9/2022 | Sole | ....................... H04L 63/101 |
| 2009/0089869 A1 * | 4/2009 | Varghese | ............... G06F 21/566 |
| | | | 726/7 |
| 2011/0119765 A1 * | 5/2011 | Hering | ................... G06F 21/577 |
| | | | 726/25 |

(Continued)

*Primary Examiner* — Joseph P Hirl
*Assistant Examiner* — Stephen T Gundry
(74) *Attorney, Agent, or Firm* — Patent Capital Group

(57) ABSTRACT

An apparatus, related devices and methods, having a memory element operable to store instructions; and a processor operable to execute the instructions, such that the apparatus is configured to identify sensitive user data stored in the memory by a first application, determine a risk exposure score for the sensitive user data, apply, based on a determination that the risk exposure score is above a threshold, a security policy to restrict access to the sensitive user data, receive a request from a second application to access the sensitive user data, determine whether the first application and the second application are similar applications, and allow access based on a determination that the first application and the second application are similar applications.

21 Claims, 11 Drawing Sheets

(56) References Cited

U.S. PATENT DOCUMENTS

| | | | |
|---|---|---|---|
| 2014/0123319 A1* | 5/2014 | Porjo | H04L 63/10 |
| | | | 726/28 |
| 2014/0258711 A1* | 9/2014 | Brannon | H04L 9/3268 |
| | | | 713/156 |
| 2014/0282977 A1* | 9/2014 | Madhu | G06Q 50/01 |
| | | | 726/7 |
| 2015/0324606 A1* | 11/2015 | Grondin | G06F 3/0482 |
| | | | 726/1 |
| 2016/0246790 A1* | 8/2016 | Cowdrey | G06F 16/285 |
| 2018/0032721 A1* | 2/2018 | De | G06F 12/1009 |
| 2018/0359244 A1* | 12/2018 | Cockerill | H04L 63/1433 |
| 2019/0356683 A1 | 11/2019 | Park et al. | |
| 2020/0285761 A1* | 9/2020 | Buck | G06F 21/62 |
| 2020/0314134 A1* | 10/2020 | Izrael | G06F 21/552 |
| 2020/0349258 A1* | 11/2020 | Frost | G06F 21/57 |
| 2021/0279357 A1* | 9/2021 | Das | H04L 63/0428 |
| 2021/0306315 A1* | 9/2021 | Wright | G06F 21/45 |
| 2022/0121777 A1* | 4/2022 | Brannon | H04L 63/0407 |
| 2022/0198458 A1* | 6/2022 | Narendranathan | |
| | | | G06Q 20/4016 |
| 2022/0229888 A1* | 7/2022 | Keith, Jr. | H04L 9/3231 |
| 2022/0245272 A1* | 8/2022 | Fleck | H04L 63/102 |
| 2022/0253430 A1* | 8/2022 | Paul | H04L 63/0428 |
| 2022/0253509 A1* | 8/2022 | Cascaes | G06F 16/9577 |
| 2022/0292180 A1* | 9/2022 | Chauhan | G06F 21/45 |
| 2022/0300584 A1* | 9/2022 | Fleck | H04L 63/20 |
| 2022/0311763 A1* | 9/2022 | Krishan | H04L 63/0853 |
| 2022/0342959 A1* | 10/2022 | Jakobsson | G06F 21/32 |

\* cited by examiner

| origin_url | action_url | username_element | username_value | password_element | password_value |
|---|---|---|---|---|---|
| filter | filter | filter | filter | filter | filter |
| 1 https://account... | https://accounts.go... | identifier | smithee@mail.com | password | BLOB |
| 2 https://mcafee.... | https://mcafee.com... | username | smithie919 | password | BLOB |
| 3 https://builde... | https://builders.in... | email | jsmith@mail.com | c_pass | BLOB |
| 4 https://app.pl... | https://app.plural... | c_username | jamessmith | Password | BLOB |
| 5 http://192.16... | http://192.16... | username | jimmy2smith | password | BLOB |

FIG. 3A

| id | guid | current_path | target_path | start_time | recvd_bytes | total_bytes |
|---|---|---|---|---|---|---|
| | filter | filter | | | filter | |
| 1 | f7a9b8cdd-fc4... | C:\Users\jhs1\Download... | C:\Users\jhs1\Downloads\NewDoc... | 1318191403... | 660514 | 660514 |
| 2 | 470943cb-afe... | C:\Users\jhs1\Download... | C:\Users\jhs1\Downloads\Ecard... | 1318193994... | 197848 | 197848 |
| 3 | https://builde... | C:\Users\jhs1\Download... | C:\Users\jhs1\Downloads\run\var... | 1318244320... | 249108 | 249108 |
| 4 | https://app.pl... | C:\Users\jhs1\Download... | C:\Users\jhs1\Downloads\Mar24... | 1318378245... | 2279176 | 2279176 |
| 5 | http://192.16... | C:\Users\jhs1\Download... | C:\Users\jhs1\Downloads\NewDoc... | 1318657538... | 3848576 | 3848576 |

| id | user_text | url | no_of_hits |
|---|---|---|---|
| 1 c62f7a9-b8cd-05a... | create profile i | https://www.google.com/search?q=create+profile+for+license&rlz=1C1... | 0 |
| 2 470ck43-cb43-afe... | create profile i | https://www.google.com/search?q=create+profile+in+workspot&rlz=1C... | 0 |
| 3 73de268-9f43-c23... | create profile in | https://www.google.com/search?q=create+profile+in+civit+3d&rlz=1C1... | 0 |
| 4 607ab42-8d83-459... | create profile i | https://www.google.com/search?q=create+profile+in+workspot&rlz=1C... | 0 |
| 5 c87729a-3ee9-e2a... | create profile in chr | https://www.google.com/search?q=create+profile+in+civit+3d&rlz=1C1... | 0 |

FIG. 3D

| guid | company_name | street_address | city | state | zipcode | country |
|---|---|---|---|---|---|---|
| 1 c62f7a9-b8cd-05a... | mcafee llc | 2821 Mission College Blvd | Santa Clara | CA | 95054 | US |
| 2 470ck43-cb43-afe... | PineTree Club | 404-8 Pine Vally Rd | Hastings | GA | 30806 | US |
| 3 73de268-9f43-c23... | Jittery coffee | 25 Shakey Lane | Meldron | MA | 12174 | US |
| 4 607ab42-8d83-459... | science inc. | 1F Downtown Dr, Domlur | Bangalore | Karnataka | 560075 | IN |
| 5 c87729a-3ee9-e2a... | teaositea | 347 Main St. | Toronto | Ontario | H9W2M5 | CA |

Table: autofill_profile_phones

| guid | number |
|---|---|
| 1 c62f7a9-b8cd-05a... | 91 05 7448 5298 |
| 2 470ck43-cb43-afe... | (855) 312-9000 |
| 3 73de268-9f43-c23... | 800686 90384 |
| 4 607ab42-8083-459... | 999999999 |
| 5 c87729a-3ee9-e2a... | (800) 737-0101 |

FIG. 3F

Table: autofill_profile_emails

| guid | email |
|---|---|
| 1 c62f7a9-b8cd-05a... | smithee@mail.com |
| 2 470ck43-cb43-afe... | smithie919@mcafee.com |
| 3 73de268-9f43-c23... | jsmith@mail.com |
| 4 607ab42-8083-459... | jamessmith@go.com |
| 5 c87729a-3ee9-e2a... | jimmy2smith@my.com |

FIG. 3E

Table: credit_cards

| guid | name_on_card | exp_month | exp_year | card_no_encrypted |
|---|---|---|---|---|
| 1 c62f7a9-b8cd-05a... | DUMMY CARD | 5 | 2020 | BLOB |
| 2 470ck43-cb43-afe... | VISA CARD | 11 | 2022 | BLOB |
| 3 73de268-9f43-c23... | AMEX CARD | 8 | 2020 | BLOB |

FIG. 3G

| User Data Description | Privacy Weight | User 1 | User 2 | User 3 |
|---|---|---|---|---|
| Email (Personal/Work) | 1 | Y | Y | Y |
| Phone number(Personal/Work) | 1 | Y | Y | N |
| Work Address | 1 | Y | Y | N |
| Gender | 2 | Y | N | Y |
| School/College/Company | 2 | Y | N | Y |
| Download History | 2 | N | N | Y |
| Home Address | 3 | Y | N | Y |
| Browsing History | 3 | Y | Y | Y |
| Personal ID Number (SSN/AADHAR/PAN) | 4 | N | N | Y |
| Passport/Driver's License Number | 4 | N | N | Y |
| Insurance/Registration Number | 4 | N | N | Y |
| Login Credentials | 5 | N | Y | Y |
| Debit Card Details | 5 | N | N | Y |
| Credit Card Details | 5 | Y | N | N |
| Risk Exposure Score | | 18 | 11 | 35 |
| Threshold Value = 14 | | High | Low | High |

FIG. 4

SECURING SENSITIVE USER DATA STORED LOCALLY BY AN APPLICATION

CROSS REFERENCE TO RELATED APPLICATION

This application claims priority to India Provisional Patent Application No. 202041015290, filed Apr. 7, 2020, and titled "SECURING SENSITIVE USER DATA STORED LOCALLY BY AN APPLICATION," the entire contents of which are hereby incorporated by reference.

TECHNICAL FIELD

This disclosure relates in general to computer security and, more particularly though not exclusively, to a system and method for securing sensitive user data stored locally by an application on a user's electronic device.

BACKGROUND

The field of computer security has become increasingly important in today's society. In particular, web-based applications can provide a medium for exchanging data between different applications and different devices connected via computer networks. While the use of a network has transformed business and personal communications, it has also been used as a vehicle for malicious operators to gain unauthorized access to computers for inadvertent or malicious disclosure of sensitive information.

In a computing system, sensitive user information is stored, transmitted, and used by many different applications. Many applications locally store sensitive user information for subsequent use so that the application may function more efficiently and may improve the user experience. For example, a web browser application may store user login credentials (e.g., user identification and password) for various webpages and may enter the user login credentials automatically. Techniques have been developed to provide for the secure storing of sensitive information on a user device that is used by an application. However, these techniques do not address the issue of protecting the sensitive information from inadvertent or intentional disclosure by non-authorized applications while providing a convenient and easy experience for a user.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, not by way of limitation, in the figures of the accompanying drawings.

FIGS. 3A-3G are exemplary tables illustrating user data stored locally by a browser, in accordance with an embodiment of the present disclosure.

FIG. 4 is an exemplary table for determining a risk exposure score, in accordance with an embodiment of the present disclosure.

DETAILED DESCRIPTION

Figure 1:
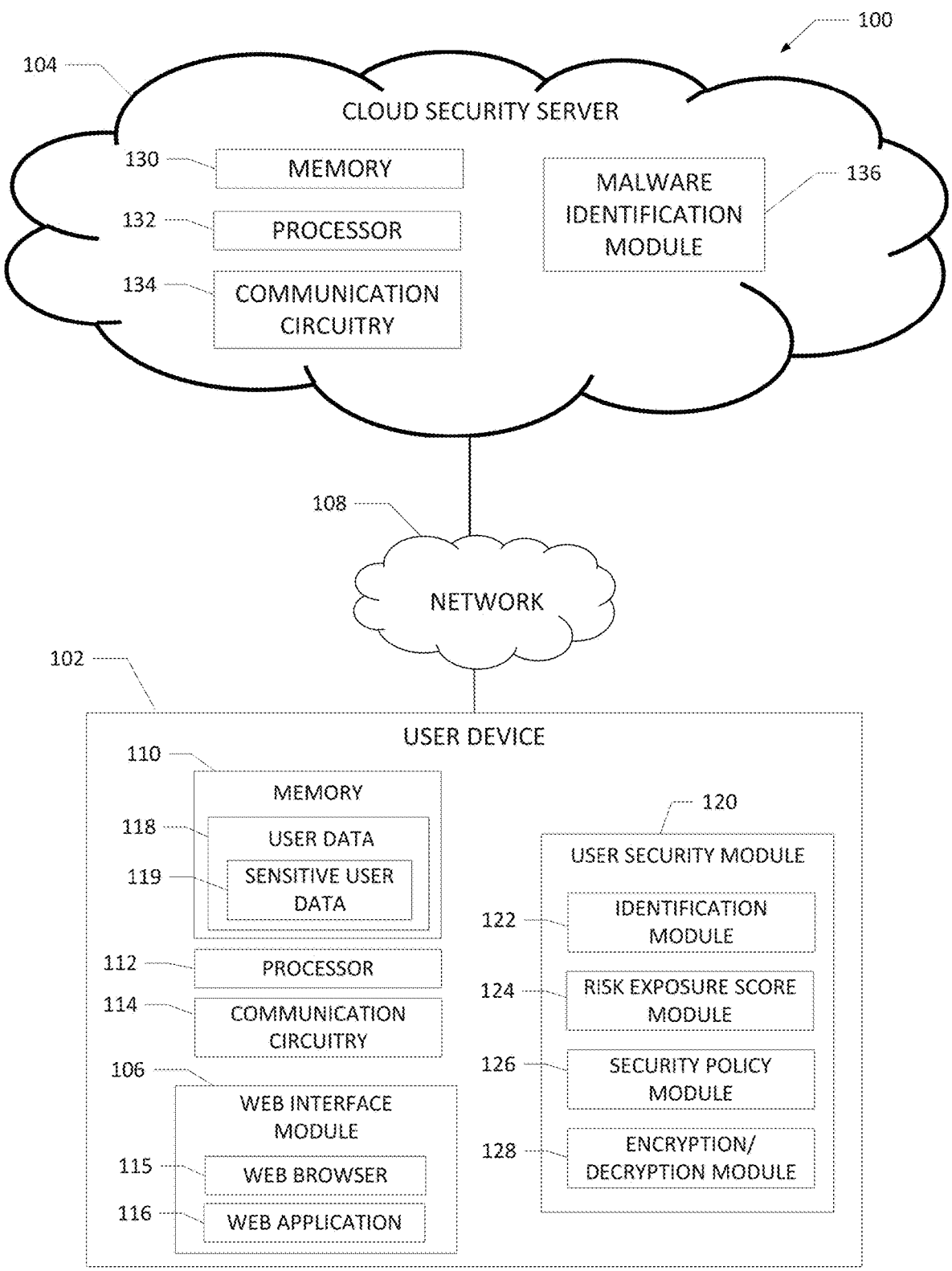
FIG. 1 is a simplified block diagram of an example system for securing sensitive user data that is stored locally by an application, in accordance with an embodiment of the present disclosure.

An apparatus, including systems and methods, for securing sensitive user data that is stored locally by a web application is disclosed herein. For example, in some embodiments, an apparatus having a memory element operable to store instructions; and a processor operable to execute the instructions, is configured to identify sensitive user data stored in the memory by a first application, determine a risk exposure score for the sensitive user data, apply, based on a determination that the risk exposure score is above a threshold, a security policy to restrict access to the sensitive user data, receive a request from a second application to access the sensitive user data, determine whether the first application and the second application are similar applications, and allow access based on a determination that the first application and the second application are similar applications.

As computer usage moves increasingly to online services, web applications have become an essential part of personal computing. Many day-to-day user activities involve using web browsers and web applications; for example, logging into social media accounts, accessing personal bank accounts, paying bills, and online purchasing, including automatic purchasing and delivery tracking. Web browsers and web applications collect and locally store user data to enhance a user's online experience and to reduce the number of repeated tasks necessary for the user's online activity. The web browsers and the web applications may share the locally stored user data with other web browsers and web applications to enable migration and portability among the web browsers and the web applications. Locally stored user data may include private and sensitive user information such as personal identity, browsing history, email addresses, contact information, home address, work address, login credentials, financial information, credit card and debit card details, as well as personal identification numbers (e.g., a social security number ("SSN") or a passport number). The locally stored user data, which typically is saved in database tables in memory on the user's device, may be stored encrypted, unencrypted, or a combination of encrypted and unencrypted. The unencrypted data is readily accessible, and the encrypted data is easily unencrypted using a decrypting software and accessible, by any application on the user device, including malware, to retrieve the unencrypted usernames and corresponding encrypted password values from the database tables. Further an application may access the user data without alerting or notifying the user. Although some web browsers offer a master password to restrict access to locally stored user data, such protections must be manually activated by a user and are typically hidden or difficult to access so they are seldom applied. Also, Users are notoriously bad at remembering passwords and prefer not to use passwords unless mandated. The local storing and sharing of sensitive user data by web browsers and web applications makes the sensitive user data vulnerable to unauthorized disclosure. In some instances, a user may inadvertently facilitate unauthorized disclosure by using weak passwords, by reusing usernames and passwords for multiple web applications, by failing to update passwords on a regular basis, and by accessing web applications on the dark web. A system for securing, from unauthorized disclosure while enabling authorized access, sensitive user data that is stored locally by web browsers and web applications may be desired.

In the following detailed description, reference is made to the accompanying drawings that form a part hereof wherein like numerals designate like parts throughout, and in which is shown, by way of illustration, embodiments that may be practiced. It is to be understood that other embodiments may be utilized, and structural or logical changes may be made without departing from the scope of the present disclosure. Therefore, the following detailed description is not to be taken in a limiting sense. For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C). The drawings are not necessarily to scale.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order from the described embodiment. Various additional operations may be performed, and/or described operations may be omitted in additional embodiments.

The description uses the phrases "in an embodiment" or "in embodiments," which may each refer to one or more of the same or different embodiments. Furthermore, the terms "comprising," "including," "having," and the like, as used with respect to embodiments of the present disclosure, are synonymous. The meaning of "a," "an," and "the" include plural references. The meaning of "in" includes "in" and "on." When used to describe a range of dimensions, the phrase "between X and Y" represents a range that includes X and Y. For convenience, the phrase "FIG. 3" may be used to refer to the collection of drawings of FIGS. 3A-3G, etc. Although certain elements may be referred to in the singular herein, such elements may include multiple sub-elements.

FIG. 1 is a simplified block diagram of a communication system 100 that enables securing sensitive user data stored locally by a web application, in accordance with an embodiment of the present disclosure. As illustrated in FIG. 1, an embodiment of communication system 100 may include a user device 102, a cloud security server 104, and network 108. The user device 102 may include memory 110, a processor 112, communication circuitry 114, a web interface module 106, and a user security module 120. The cloud security server 104 may include memory 130, a processor 132, communication circuitry 134, and a malware identification module 136. The user device 102 and cloud security server 104 may be in communication using network 108.

The user device 102 may be a network element and include, for example, desktop computers, laptop computers, mobile devices, personal digital assistants, smartphones, tablets, or other similar devices. The user device 102 also may be referred to herein as "client device" or "electronic device." The user device 102 may include one or more processors 112 for executing any type of instructions associated with the user device achieving the operations detailed herein. The processor 112 is connected to memory 110 and communication circuitry 114. The processor 112 may be based on one or more processors, microcontrollers, microprocessors, and programmable logic devices, among others. The memory 110 may store computer executable instructions or computer executable components as well as other data. The processor 112 executes computer executable instructions stored in memory 110. The memory 110 may store user data 118 and sensitive user data 119 used by the web browser 115 and/or web application 116. The communication circuitry 114 may be used to send and receive commands, requests, and other data to and from the user device 102.

The user device 102 may include the web interface module 106 to interface with a web browser 115 and a web application 116 that locally store user data 118 and sensitive user data 119 in the memory 110. A web application 116 may include any client-server computer program that the client computer runs (e.g., via a user interface and/or client-side logic) in a web browser 115. Examples of web applications 116 include online retail sales, online banking, social media accounts, online gaming, and webmail, such as Mozilla® Thunderbird®, Microsoft® Outlook®, Google® Gmail®, and Apple® iCloud® mail. Examples of web browsers 115 include Mozilla Foxfire® browser, Apple Safari® application program, Google Chrome™ browser, and Microsoft Internet Explorer® browser. Although FIG. 1 depicts a single web browser 115 and a single web application 116, the web browser 115 may include one or more web browsers and the web application 116 may include one or more web applications. The user data 118, which may include sensitive user data 119, may be stored in memory 110 by the web browser 115 and/or the web application 116.

The user device 102 may include a user security module 120 for determining whether sensitive user data 119 is stored locally by the web browser 115 and/or the web application 116, and for assigning a score categorizing the risk associated with exposure of the sensitive user data 119. The user security module 120 may include an identification module 122, a risk exposure score module 124, a security policy module 126, and an encryption/decryption module 128. User security module 120 may be configured to manage security for user data 118, in particular, sensitive user data 119, being stored locally on the client device 102 and being access by web browsers 115 and web applications 116 via network 108. In some embodiments, the web interface module 106 and the user security module 120 are combined in a single module. In some embodiments, the web interface module 106 and the user security module 120 are separate modules. In some embodiments, the security policy module 126 and/or the encryption/decryption module 128 are separate from the user security module 120.

The user security module 120 may be configured to access user data 118 stored locally on user device 102, to identify sensitive user data 119, and to restrict access to the sensitive user data 119. The user security module 120 may be further configured to determine a risk exposure score associated with unauthorized access of the sensitive user data 119 and, based on the assigned risk exposure score, to apply a security policy or to encrypt and decrypt the sensitive user data 119. The user security module 120 may be further configured to decrypt sensitive user data 119 stored locally on the user device 102 based on a request by an authorized web browser or web application to access the sensitive user data 119 data. The identification module 122 identifies the web browsers 115, the web applications 116, and the user data 118 stored locally, for example, in memory 110 on the user device 102. The identification module 122 also determines whether the user data 118 includes sensitive user data 119. The risk exposure score module 124 determines a risk of exposure of the sensitive user data 119 and assigns a risk exposure score, as described in detail with reference to FIG. 4. Based on a risk exposure score having a value above a threshold, the security policy module 126 may assign a security policy to restrict access to the sensitive user data 119. The encryption/decryption module 128 may perform additional encryption and decryption of the user data 118 and the sensitive user data 119 (i.e., in addition to how the data is stored locally, whether encrypted or unencrypted). For example, the encryption/decryption module 128 in combination with the security policy module 126 may restrict access to the sensitive user data 119 by encrypting the sensitive user data 119 when at rest. The security policy module 126 may verify the web browser 115 or the web application 116 prior to requesting decryption by the encryption/decryption module 128 and allowing the verified web browser 115 or verified web application 116 access to the decrypted sensitive user data 119. In some embodiments, the security policy module 126 may protect the sensitive user data 119 by restricting access only to web browsers 115 or to web applications 116 with similar processes.

Cloud security server 104 may include memory 130, a processor 132, communication circuitry 134, and a malware identification module 136. The processor 132 is connected to memory 130 and communication circuitry 134. The processor 132 may be based on one or more processors, microcontrollers, microprocessors, and programmable logic devices, among others. Memory 130 may store computer executable instructions or computer executable components as well as other data. The processor 132 executes computer executable instructions stored in memory 130. The communication circuitry 134 may be used to send and receive commands, requests, and other data to and from the cloud security server 104. Electronic device 102 and cloud security server 104 may be in communication using network 108. The malware identification module 136 may receive, from the user security module 120, data associated with an unauthorized attempt to access the sensitive user data 119 and may analyze the received data to identify malware and exploitative/rogue applications. The malware identification module 136 may send to the user security module 120 the results of the data analysis and may identify malware or particular web applications 116 as malware or exploitative/rogue applications.

The one or more processors 112 of the user device 102 may include, without limitation, a central processing unit (CPU), a digital signal processor (DSP), a reduced instruction set computer (RISC), a complex instruction set computer (CISC), a microprocessor, a microcontroller, a field programmable gate array (FPGA), or any combination thereof. The processors may be implemented in hardware, or combinations of hardware, and software and/or firmware, as appropriate. Software or firmware implementations of the processors may include computer-executable or machine-executable instructions written in any suitable programming language to perform the various functions described. Hardware implementations of the processors may be configured to execute computer-executable or machine-executable instructions to perform the various functions described. The user device 102 may include a chipset (not shown) for controlling communications between one or more processors and one or more of the other components of the device. The processors 112 may also include one or more application specific integrated circuits (ASICs) or application specific standard products (ASSPs) for handling specific data processing functions or tasks.

The user device 102 may include one or more memory elements 110 for storing information and data. The one or more memory elements 110 may include one or more volatile and/or non-volatile memory devices such as, but not limited to, magnetic storage devices, read only memory (ROM), random access memory (RAM), dynamic RAM (DRAM), static RAM (SRAM), synchronous dynamic RAM (SDRAM), double data rate (DDR) SDRAM (DDR-SDRAM), RAM-BUS DRAM (RDRAM), flash memory devices, electrically erasable programmable read only memory (EEPROM), non-volatile RAM (NVRAM), universal serial bus (USB) removable memory, or combinations thereof. The memory 110 may store program instructions that are loadable and executable on the processor(s) as well as data generated or received during the execution of these programs. The memory 110 may have stored thereon software modules and/or instructions associated with other components of the device. The memory 110 may include one or more operating systems (O/S) application software.

The user device 102 may include communication circuitry 114. The communication circuitry 114 of the user device 102 may be embodied as any communication circuitry, device, or collection thereof, capable of enabling communications between the user device 102 and other remote devices (e.g., the remote malware identification module 136). The terms "communication circuitry" and "input/output (I/O) circuitry" may be used interchangeably herein. The communication circuitry 114 may be configured to use any one or more communication technology (e.g., wireless or wired communications) and associated protocols (e.g., Ethernet, Bluetooth®, Wi-Fi®, WiMAX, etc.) to effect such communication. The user device 102 may further include GPS and other location identifiers. The user device 102 may further include peripheral devices (not shown), which may include any number of additional peripheral or interface devices and associated I/O circuitry, such as speakers, microphones, additional storage devices, among others.

Network 108 represents interconnected communication paths for receiving and transmitting packets of information that propagate through the communication system 100. Network 108 may provide a communicative interface between devices and may be configured as any local area network (LAN), virtual local area network (VLAN), wide area network (WAN), wireless local area network (WLAN), metropolitan area network (MAN), Intranet, Extranet, virtual private network (VPN), and any other appropriate architecture or system that facilitates communications in a network environment, or any suitable combination thereof, including wired and/or wireless communication. Network 108 may include a network controller.

In communication system 100, network traffic, which is inclusive of packets, frames, signals, and data, among others, may be sent and received according to any suitable communication messaging protocols. Suitable communication messaging protocols can include a multi-layered scheme such as Open Systems Interconnection (OSI) model, or any derivations or variants thereof (e.g., Transmission Control Protocol/Internet Protocol (TCP/IP), user datagram protocol/IP (UDP/IP)). Additionally, radio signal communications over a cellular network may be provided. Suitable interfaces and infrastructure may be provided to enable communication with the cellular network.

The term "packet" as used herein, refers to a unit of data that may be routed between networked devices or between a device and the cloud security server 104. A packet may include a source network address and a destination network address. These network addresses may be Internet Protocol (IP) addresses in a TCP/IP messaging protocol. The term "data" as used herein, refers to any type of binary, numeric, voice, video, textual, or script data, or any type of source or object code, or any other suitable information in any appropriate format that may be communicated from one point to another in electronic devices and/or networks. Additionally, messages, requests, responses, and queries are forms of network traffic, and therefore, may comprise packets, frames, signals, and/or data.

As used in any embodiment herein, the term "module" may refer to hardware, firmware and/or circuitry configured to perform any of the aforementioned operations. A module also may include software. Software may be embodied as a software package, code, instructions, instruction sets and/or data recorded on non-transitory computer readable storage mediums. Firmware may be embodied as code, instructions or instruction sets and/or data that are hard-coded (e.g., nonvolatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The modules may, collectively or individually, be embodied as circuitry that forms a part of one or more devices, as defined previously. The terms "module," "engine," and "administrator" may be used interchangeably herein.

Figure 2:
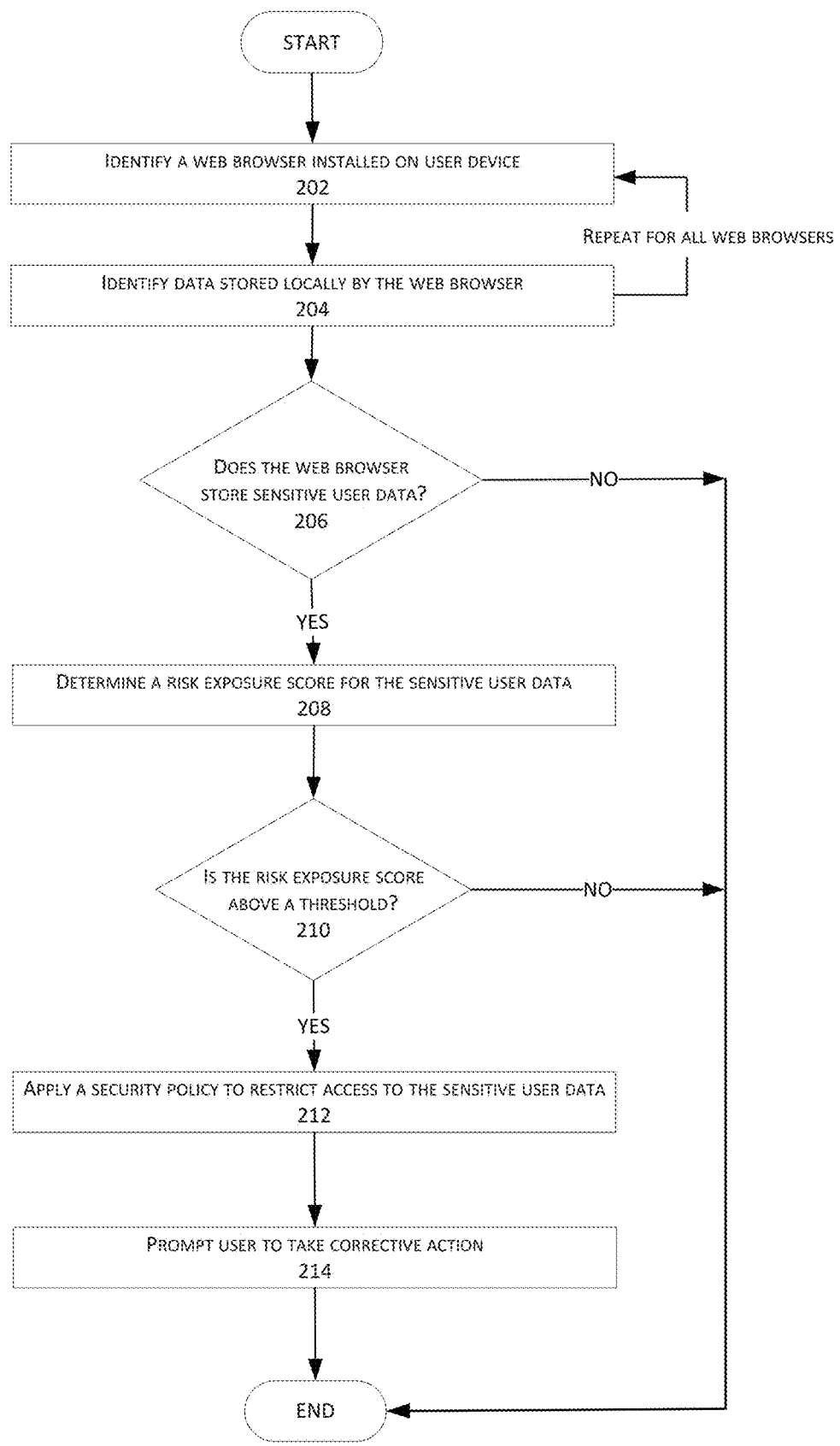
FIG. 2 is a simplified flowchart illustrating potential operations that may be associated with securing sensitive user data that is stored locally by a browser, in accordance with an embodiment of the present disclosure.

FIG. 2 is a flow diagram illustrating possible operations that may be associated with securing sensitive user data stored locally by a web browser, in accordance with an embodiment. Although FIG. 2 illustrates operations associated with a web browser, the operations may be associated with a web application. The one or more operations may be performed by the web interface module 106, by the user security module 120, or by a combination of the web interface module 106 and the user security module 120. At 202, a web browser installed on the user device is identified. For example, a web browser installed on the user device and corresponding data storage locations may be identified by searching for specific executables at specific locations and verifying its digital signature. At 204, data stored locally by the web browser is identified. The locally stored data may be identified using any suitable technique, including, for example, the technique described below with reference to FIG. 3. In some embodiments, unencrypted data stored in web browser database files is searched. In some embodiments, encrypted data stored in web browser database files is decrypted and, then searched with the other data that is stored unencrypted. The operations at 202 and 204 may be repeated to identify all web browsers installed on the user device and to identify all data stored locally by the installed web browsers. At 206, the data stored locally by the web browser is analyzed to determine whether the data includes sensitive user data. For example, the locally stored data includes sensitive user data when the data includes login credentials (e.g., user ID and password), financial information, unique personal identifiers, medical information, or other similar information. If the locally stored data does not include sensitive user data, the process completes. If the locally stored data does include sensitive user data, then the process proceeds, and a list of data files that include the sensitive user data may be filtered out and identified as containing sensitive user data. At 208, a risk exposure score for the sensitive user data is determined. A risk exposure score may be determined using any suitable technique, including, for example, the technique described below with reference to FIG. 4. In some embodiments, a risk exposure score may be assigned based on the type of sensitive user data that is stored locally. In some embodiments, a risk exposure score may be assigned based on the amount of sensitive user data that is stored locally. In some embodiments, a risk exposure score may be calculated based on the type and the amount of sensitive user data that is stored locally. At 210, the risk exposure score is compared to a threshold value to determine whether the risk exposure score is above the threshold value. If the risk exposure score is not above the threshold value, the process completes. If the risk exposure score is above the threshold value, the process continues, and at 212, a security policy is applied to restrict access to the sensitive user data. In some embodiments, the security policy may encrypt the sensitive user data at rest. In some embodiments, the security policy may access protect the sensitive user data while in use by a web browser. For example, the sensitive user data may be encrypted using a standard encryption mechanism provided by a user device operating system and access to the encrypted sensitive user data may be restricted using access protection controls of an access control software, such as, for example, McAfee VSCore. In some embodiments, the access protection controls may be set by default to block all the access (e.g., read, write, and read-write) to the sensitive user database files. At 214, a user may be prompted to take corrective action to further protect the sensitive user data or to reduce the risk exposure score for the sensitive data, including, for example, deleting sensitive user data stored locally by the web browser, improving a strength of a password, changing a password, making all passwords unique (i.e., not re-using a password), or scanning the user device with anti-malware software, among others.

FIGS. 3A-3G are simplified tables illustrating various examples of how a web browser may locally store user data, for example, in SQLite database files, obscured as normal files. The database files may be searched to identify user data, including sensitive user data, that is stored locally both in encrypted and unencrypted formats. Although the examples depicted in FIGS. 3A-3G include search results from a Chrome web browser, these examples may apply generally to web browsers and web applications because they typically locally store user data using similar techniques. The tables in FIG. 3 have been simplified and actual database tables may include additional rows and/or columns of information.

FIG. 3A shows an example of a user's login credentials that are locally stored in: C:\Users\<User_Name>\AppData\Local\Google\Chrome\User Data\Default\Login Data. For example, the login credentials stored by the web browser include an origin Uniform Resource Locator (URL), an action URL, a username element, a username value, a password element, and a password value. The password value is stored encrypted. All other entries in the user credentials table, other than the password value, are stored unencrypted.

FIG. 3B shows an example of a user's download history including the location that is locally stored in: C:\Users\ <User_Name>\AppData\Local\Google\Chrome\User Data\ Default\History. For example, the download history stored by the web browser includes a globally unique identifier (GUID), a current path, a target path, a start time, a number of received bytes, and a total number of bytes. All entries in the download history table are stored unencrypted.

FIG. 3C shows an example of a user's keystroke patterns and a corresponding URL prefetch predictor output that are stored locally by the web browser and available in: C:\Users\ <User_Name>\AppData\Local\Google\Chrome\User Data\ Default\Network Action Predictor. For example, the keystroke patterns stored by the web browser includes a unique identifier, user text, a predictive URL corresponding to the user text, and a number of hits. The user text and predictive URL may clearly identify the searches performed by the user. All entries in the keystroke patterns table are stored unencrypted.

FIGS. 3D-3F show various examples of a user's autofill information, such as name, email address, contact details, and company address, that are stored locally by the web browser in: C:\Users\<User_Name>\AppData\Local\ Google\Chrome\User Data\Default\Web Data. The autofill information is automatically retrieved and entered for the user when prompted (e.g., when making an online purchase, the user's name may be populated after a first letter is entered). FIG. 3D shows an example of a user's autofill company address data that includes a GUID, a company name, a street address, a city, a state, a zip code, and a country. All entries in the autofill company address table are stored unencrypted. FIG. 3E shows an example of a user's autofill email address data that includes a GUID and a user's email address. All entries in the autofill email address table are stored unencrypted. FIG. 3F shows an example of a user's autofill phone number data that includes a GUID and a phone number. All entries in the autofill phone number table are stored unencrypted.

FIG. 3G shows an example of a user's autofill financial information, such as credit card information, payment data, and debit card details, that are stored locally by the web browser and also available in: C:\Users\<User_Name> \AppData\Local\Google\Chrome\User Data\Default\Web Data. For example, the autofill financial information stored by the web browser includes a GUID, a name on card, an expiration month, an expiration year, and a card number. The card number is stored encrypted and all other entries in the autofill financial data table are stored unencrypted. In some embodiments, the card numbers are stored unencrypted. The unencrypted data is readily accessible, and the encrypted data is easily decrypted, for example, using Microsoft® CryptoUnprotectData function and Python® decrypting software to retrieve unencrypted usernames and corresponding encrypted password values from the database tables unless access protection controls, as described above with reference to FIG. 2, are put in place. In cases where a user device has multiple users and each user has an individual user profile, the locally stored user data (e.g., usernames and corresponding password values) may be retrieved for each individual user profile.

FIG. 4 is an exemplary table for determining a risk exposure score for sensitive user data stored locally by an application, in accordance with an embodiment. A risk exposure core is a numerical representation of the threat posed by the disclosure of the sensitive user data. The risk exposure score may be calculated using any suitable technique, for example, using a weighted average. For example, as shown in FIG. 4, the risk exposure score may be calculated for the sensitive user data by categorizing different types of sensitive user data, applying a privacy weight to the different categories of sensitive user data, identifying whether the category of sensitive user data is present or stored on a user's device (e.g., User 1 device, User 2 device, or User 3 device), and calculating the weighted average (i.e., multiplying the sensitive user data present by the privacy weight and summing the products to determine a risk exposure score for each user. The risk exposure score for User 1 is 18, for User 2 is 11, and for User 3 is 35. A threshold value is a numerical representation assigning a risk level to the risk exposure score. For example, as shown in FIG. 4, a threshold value is 14, such that a risk exposure score having a value greater than 14 may be designated as high risk (e.g., User 1 and User 3). In some embodiments, the threshold value may be assigned based on a percentage of a maximum risk exposure score possible with the applied calculation. For example, the maximum risk exposure score possible in FIG. 4 is 42, and the threshold value (e.g., 14) is one-third of the maximum value. In some embodiments, the threshold value may include a range of values indicating a low risk range, a medium risk range, and a high risk range. The threshold value may indicate that additional actions can be taken to further protect the sensitive user data from inadvertent exposure. For example, when the risk exposure score exceeds the threshold value, potential corrective actions may be identified, and a user may be prompted to take one or more of the identified corrective actions. In another example, a user may be prompted to take one or more corrective actions, when the risk exposure score is in the high threshold range, or where a user is prompted to take corrective action when the risk exposure score is in the medium or high threshold ranges. Although FIG. 4 shows the risk exposure scores having particular numerical values, and a particular threshold value, any numerical values may be assigned to the risk exposure score and the threshold value.

As used herein, a greater risk exposure score indicates a higher risk of exposure and a lesser risk exposure score indicates a lower risk of exposure. For example, the leaking of a user's bank account login credentials poses a greater threat because someone other than the user could access the user's bank account. In another example, the leaking of a user's credit card details poses a higher risk as the leaked information could allow for fraudulent purchases. In another example, the disclosure of a user's personal information, including email address, phone number, home address, and birth date, poses a higher risk as it could result in identity theft. In some embodiments, the risk exposure score is calculated based on all user data stored locally by web browsers and web applications installed on the user device. In some embodiments, the risk exposure score is calculated based on only a portion of the user data stored locally by web browsers and web applications installed on the user device. For example, the risk exposure score may be calculated only based on sensitive user data, only based on sensitive user data having a higher privacy weight (e.g., financial information or unique identification numbers), or only based on sensitive user data locally stored by a particular web browser. In some embodiments, the risk exposure score may be calculated to be greater based on the total amount of sensitive user data stored locally as a disclosure of collective data poses a greater risk than a disclosure of individual data.

For example, while the individual disclosure of a user's email address, phone number, home address, or browsing history poses a low risk, the collective disclosure of this data poses a higher risk (e.g., a medium to high risk) because a user's identity may be ascertained from this collection of data.

Figure 5:
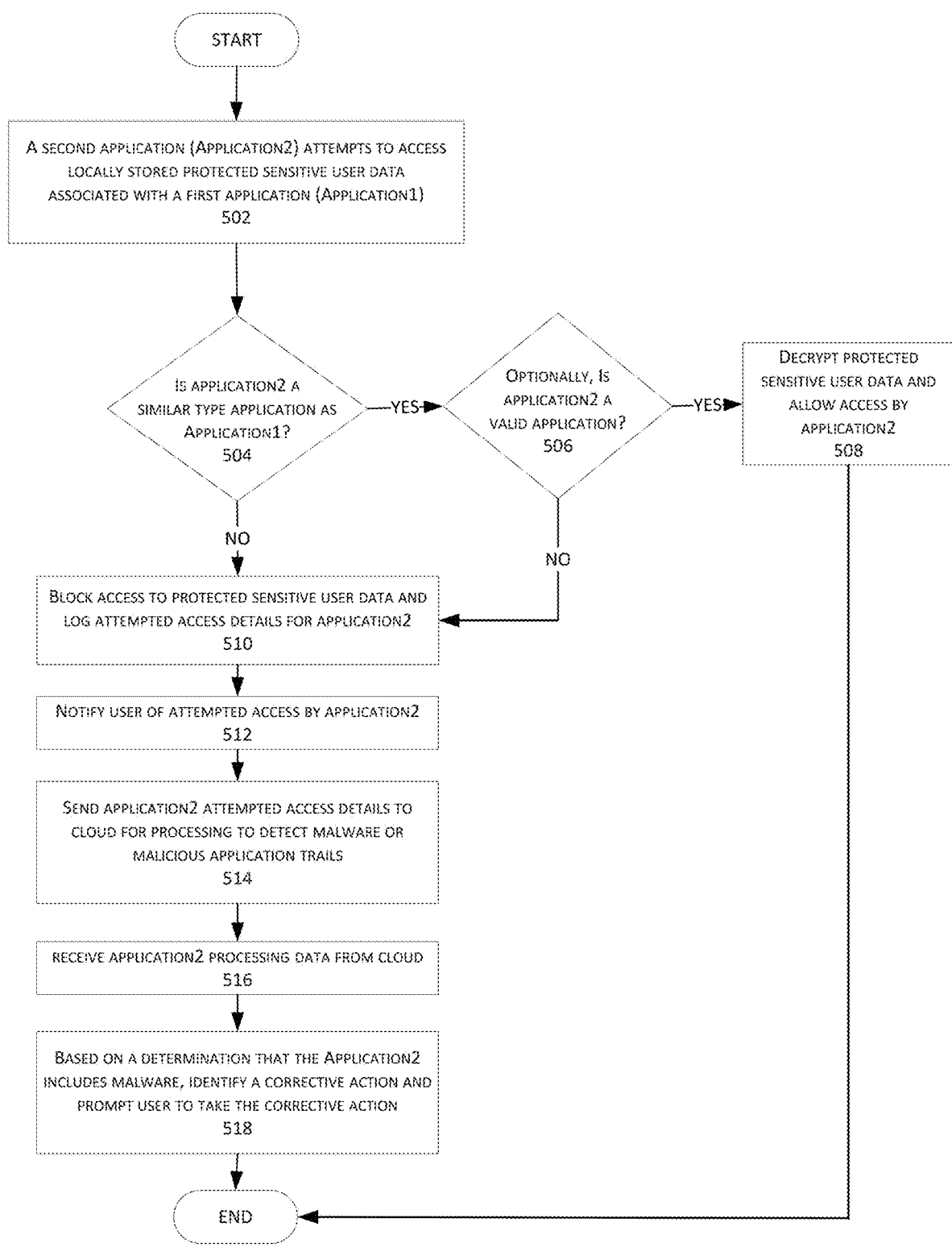
FIG. 5 is a simplified flowchart illustrating additional potential operations that may be associated with securing sensitive user data that is stored locally by an application, in accordance with an embodiment of the present disclosure.

FIG. 5 is a flow diagram illustrating possible operations that may be associated with securely sharing sensitive user data stored locally by a web browser, in accordance with an embodiment. One or more operations may be performed by the web interface module 106, by the user security module 120, or by a combination of the web interface module 106 and the user security module 120. At 502, a web browser is locally storing sensitive user data associated with a first web application (Application1) that is protected by a security policy that restricts access, for example, as described above in FIG. 2, and a second web application (Application2) attempts to access or requests access to the protected sensitive user data. At 504, the second application is compared to the first application to determine whether the second application is a same or similar type application as the first application. In some embodiments, the first and second applications may be a same application, where the application attempting to access the sensitive user data is the same application that stored the sensitive user data. For example, the application may be a web browser that stored login credentials for a website and the same web browser is trying to access the login credentials. In some embodiments, the first and second applications may be similar type applications. For example, the first and second applications are similar type applications when the first and second applications are both word processing programs, such as Apple Pages and Corel® WordPerfect®, or when the first and second applications are both web browsers, such as Mozilla Foxfire and Google Chrome. In some embodiments, the first and second applications are similar type applications if the first and second applications are associated applications (e.g., within a family of applications). For example, Microsoft Office applications are associated applications, and, if the first application is Microsoft Word and the second application is Microsoft PowerPoint, the first and second applications are similar type applications. In an opposite example, the first and second applications are not of a similar type if the first application is a spreadsheet software program, such as Microsoft Excel, and the second application is an imaging and graphic design software program, such as Adobe® Photoshop. If the first and second applications are determined to be of a similar type, the operations optionally proceed to 506.

In some embodiments, a user may decide whether to allow the second application access to the sensitive user data stored by the first application. For example, when the second application attempts to access the sensitive user data stored by the first application, the user is notified, and access is granted if the user permits. In granting access to the second application, if the second application is not running, the sensitive user data files are encrypted and the access controls are set to allow one-time access, and, if the second application is running, the access controls are set to allow one-time access. In some embodiments, the user may enable access by whitelisting certain applications or deny access by blacklisting certain applications.

At 506, the second application is analyzed to determine whether it is a valid application. In some embodiments, the parameters of the second application are identified and verified to determine whether the second application is a genuine process. For example, various parameters of the second application, such as an execution path, command line parameters, a loaded dynamic link library (DLL), a file handle, or a registry handle, may be authenticated. In some embodiments, the second application may be searched in a whitelist or in a blacklist. For example, in some embodiments, If the second application is determined to be a valid application, the operations continue to 508. At 508, the protected sensitive user data is decrypted, and the second application is granted access to the sensitive user data. If the second application is not a similar type application as the first application as determined at 504, or if the second application is not a valid process as determined at 506, then the operations proceed to 510. At 510, the second application is denied access to the protected sensitive user data and the details related to the attempted access are logged. At 512, the user may be notified of the attempted access by the second application to the protected sensitive user data. In some embodiments, the user may be notified after the data related to the attempted access is processed in the cloud and determined to be malware (e.g., after 516). At 514, the logged data related to the attempted access by the second application is sent to a cloud server, such as the cloud security server 104 of FIG. 1, for processing to detect whether the second application is malware or whether the second application has malicious processing trails. The logged data may be uploaded to the cloud for analysis, and may include process details of the application, such as a file handle, a registry handle, an execution path, socket connections, a parent process, and a loaded DLL. The analysis performed by the cloud server may include scanning for malware, searching a whitelist, or searching a blacklist to identify malware or a rouge application. At 516, the processing data related to the attempt by the second application to access the protected sensitive user data is received from the cloud server, and the second application may be identified as malware or may be identified as having malicious trails. At 518, based on a determination that the second application is malware or may be malicious, a corrective action is identified, and the user is prompted to take the corrective action. In some embodiments, the user may be prompted to scan for malware, download updated malware scanning software, delete the second application, add the second application to a blacklist, or take other remedial action. In some embodiments, the corrective action may be performed and enforced by the user security module.

Figure 6:
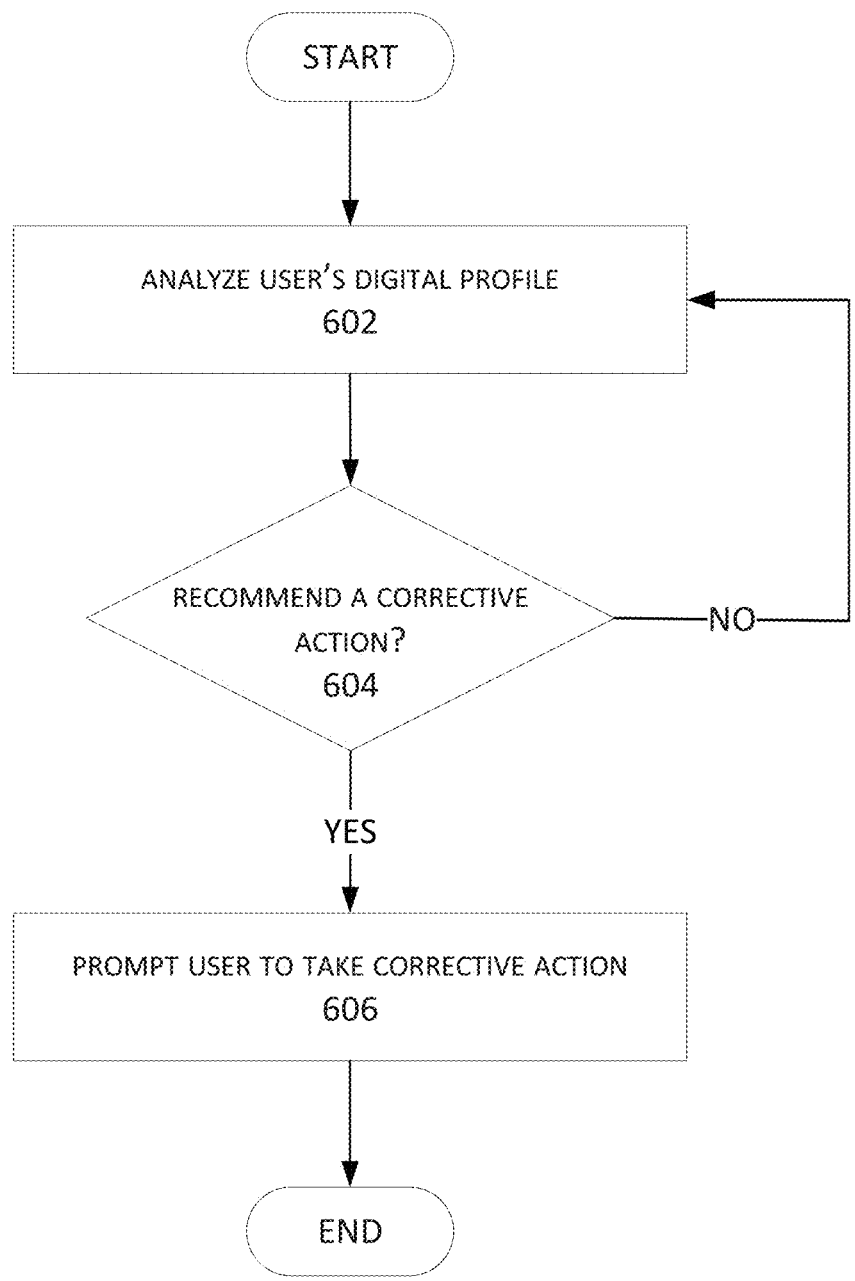
FIG. 6 is a simplified flowchart illustrating other potential operations that may be associated with securing sensitive user data that is stored locally by an application, in accordance with an embodiment of the present disclosure.

FIG. 6 is a flow diagram illustrating possible operations that may be associated with identifying a corrective action to further protect sensitive user data, in accordance with an embodiment. At 602, a user's digital profile is inspected and analyzed. In some embodiments, a user's digital profile may be scanned to identify the user's online browsing history, online accounts, bookmarks, frequently visited websites, favorite websites, online purchasing history, and whether the user has visited and/or transacted with known suspicious or malicious websites. In some embodiments, a user's passwords across different login accounts may be evaluated and a password similarity score may be assigned to the different passwords. In some embodiments, a password may be evaluated to determine a password strength and a password strength (or weakness) score may be assigned. In some embodiments, sensitive user data stored locally may be identified and a risk exposure score may be assigned, as described above with reference to FIGS. 3 and 4. In some embodiments, the user's password habits (e.g., how often the user changes a password) may be determined. In some embodiments, the user's account URL value may be used to check for a threat reputation score using an anti-malware service, for example, such as McAfee Global Threat Intelligence (GTI), or to check for a privacy reputation score, such as McAfee Cloud Access Security Broker (CASB). A privacy reputation score may rank a website's privacy practices by identifying whether a website acts to secure user data. For example, a website that shares user data with third parties, and that securely or non-securely stores user data, including sensitive user data may be assigned a low privacy reputation score.

At 604, based on the inspection results of user's digital profile, a determination of whether or not to recommend a corrective action is made (e.g., possible corrective actions may be identified and communicated to the user). For example, if a password strength is weak, a same password is used across different accounts, or a similar password is used across different accounts, where a first password may be derived from a second password in a small number of transformation operations, a corrective action may be to change a password. If the user has not changed a password for a defined period of time (e.g., in the past six months), the user may be prompted to change the password. If a reputation of a URL that the user visited is determined to be bad, or if a privacy risk or security threat is associated with the URL, a corrective action may be to clean up or delete the user's account from the associated website. If the risk exposure score assigned to the user's sensitive data is above a threshold or within a range of values, a corrective action may be recommended to periodically delete sensitive user data from the web browser databases. If the risk exposure score can be improved, a corrective action may be recommended to delete a particular type of sensitive user data from the web browser databases. If it is determined that a corrective action is not recommended, the user's digital profile may be re-inspected and the operations at 602 and 604 may be repeated until a corrective action is recommended. At 606, the user is prompted to take the recommended corrective action. If the corrective action is not performed within a certain or predefined time period, the user may be re-prompted to take the recommended corrective action.

Figure 7:
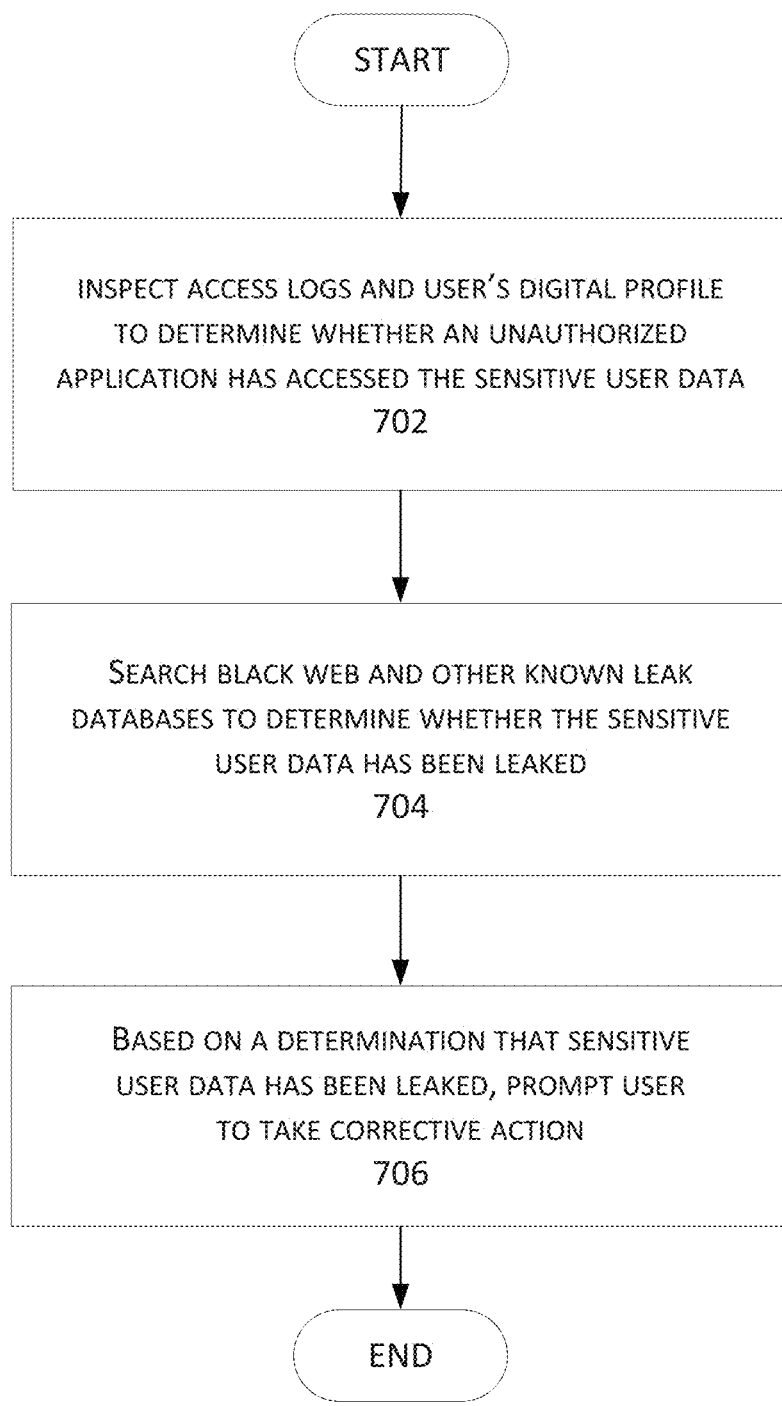
FIG. 7 is a simplified flowchart illustrating other potential operations that may be associated with securing sensitive user data that is stored locally by an application, in accordance with an embodiment of the present disclosure.

FIG. 7 is a flow diagram illustrating other possible operations that may be associated with identifying a corrective action to further protect sensitive user data, in accordance with an embodiment. At 702, a user's access logs and digital profile are inspected to determine if an unauthorized application has accessed sensitive user data. For example, the user's access logs may identify unauthorized access to account login credentials, credit card details, personal identification numbers, or other sensitive user data stored locally by a web browser or a web application. At 704, based on a determination that the sensitive user data may have been accessed by an unauthorized application, the black web and other known leak databases and websites may be searched to determine whether the sensitive user data has been leaked. If the sensitive user data is found on the black web or other known leak sites, the sensitive user data is presumed to have been leaked by the unauthorized application. At 706, based on determination that the sensitive user data has been leaked, the user is prompted to take corrective action. For example, the user may be prompted to delete sensitive user data, to run anti-malware software, to change online behavior (e.g., avoid particular websites), to cancel a credit card, or to take any of the corrective actions described above with reference to FIG. 6.

Figure 8:
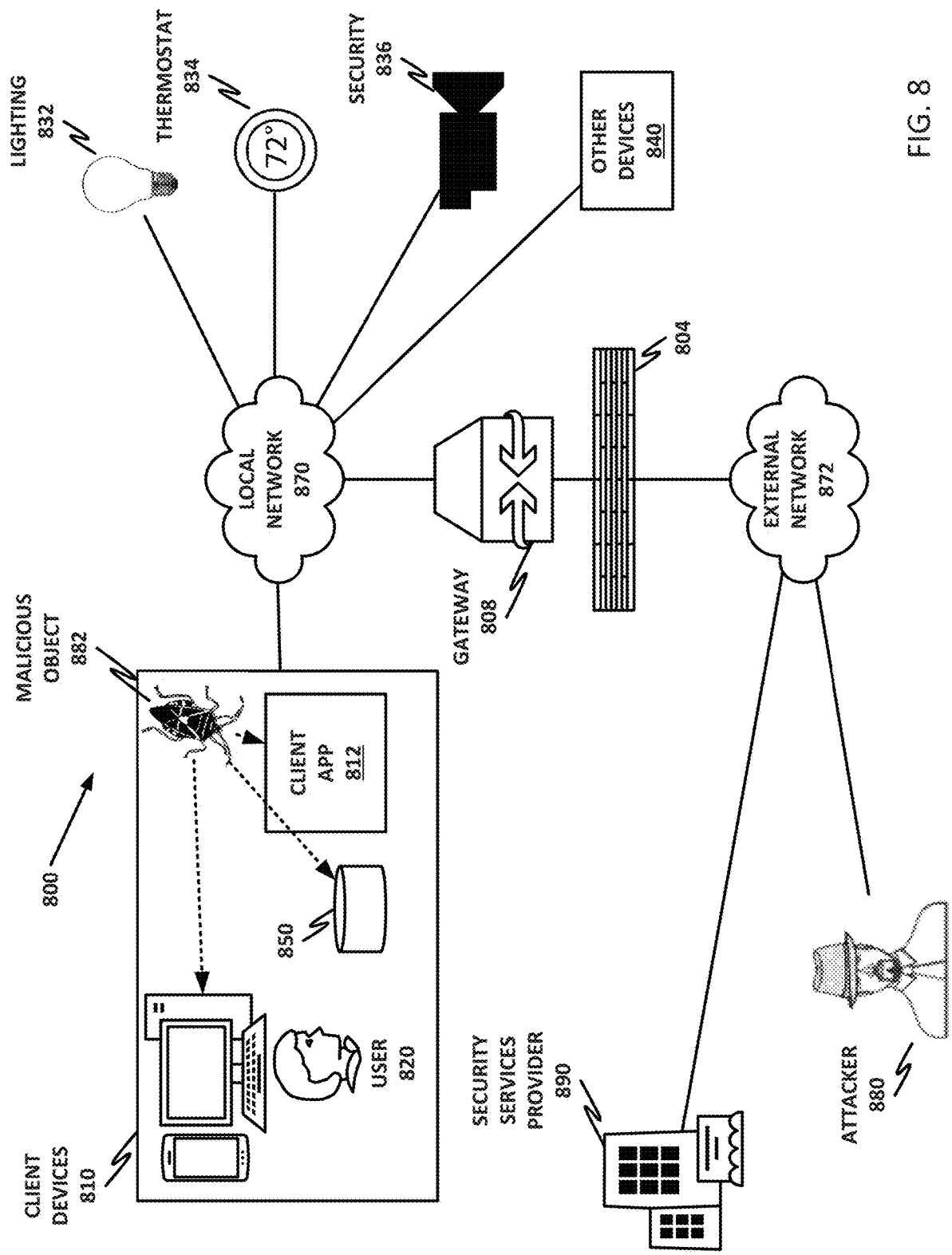
FIG. 8 is a block diagram of selected elements of a security ecosystem.

FIG. 8 is a block diagram of a security ecosystem 800. In the example of FIG. 8, security ecosystem 800 may be an enterprise, a government entity, a data center, a telecommunications provider, a "smart home" with computers, smart phones, and various internet of things (IoT) devices, or any other suitable ecosystem. Security ecosystem 800 is provided herein as an illustrative and nonlimiting example of a system that may employ, and benefit from, the teachings of the present specification.

Within security ecosystem 800, one or more users 820 operate one or more client devices 810. A single user 820 and single client device 810 are illustrated here for simplicity, but a home or enterprise may have multiple users, each of which may have multiple devices, such as desktop computers, laptop computers, smart phones, tablets, hybrids, or similar.

Client devices 810 may be communicatively coupled to one another and to other network resources via local network 870. Local network 870 may be any suitable network or combination of one or more networks operating on one or more suitable networking protocols, including a local area network, a home network, an intranet, a virtual network, a wide area network, a wireless network, a cellular network, or the internet (optionally accessed via a proxy, virtual machine, or other similar security mechanism) by way of nonlimiting example. Local network 870 may also include one or more servers, firewalls, routers, switches, security appliances, antivirus servers, or other network devices, which may be single-purpose appliances, virtual machines, containers, or functions. Some functions may be provided on client devices 810.

In this illustration, local network 870 is shown as a single network for simplicity, but in some embodiments, local network 870 may include any number of networks, such as one or more intranets connected to the internet. Local network 870 may also provide access to an external network, such as the internet, via external network 872. External network 872 may similarly be any suitable type of network.

Local network 870 may connect to the internet via gateway 808, which may be responsible, among other things, for providing a logical boundary between local network 870 and external network 872. Local network 870 may also provide services such as dynamic host configuration protocol (DHCP), gateway services, router services, and switching services, and may act as a security portal across local boundary 804.

In some embodiments, gateway 808 may be a standalone internet appliance. Such embodiments are popular in cases in which ecosystem 800 includes a home or small business. In other cases, gateway 808 may run as a virtual machine or in another virtualized manner. In larger enterprises that features service function chaining (SFC) or network function virtualization (NFV), gateway 808 may be include one or more service functions and/or virtualized network functions.

Local network 870 may also include a number of discrete IoT devices. For example, local network 870 may include IoT functionality to control lighting 832, thermostats or other environmental controls 834, a security system 836, and any number of other devices 840. Other devices 840 may include, as illustrative and nonlimiting examples, network attached storage (NAS), computers, printers, smart televisions, smart refrigerators, smart vacuum cleaners and other appliances, and network connected vehicles.

Local network 870 may communicate across local boundary 804 with external network 872. Local boundary 804 may represent a physical, logical, or other boundary. External network 872 may include, for example, websites, servers, network protocols, and other network-based services. In one example, an attacker 880 (or other similar malicious or negligent actor) also connects to external network 872. A security services provider 890 may provide services to local network 870, such as security software, security updates, network appliances, or similar. For example, MCAFEE, LLC provides a comprehensive suite of security services that may be used to protect local network 870 and the various devices connected to it.

It may be a goal of users 820 to successfully operate devices on local network 870 without interference from attacker 880. In one example, attacker 880 is a malware author whose goal or purpose is to cause malicious harm or mischief, for example, by injecting malicious object 882 into client device 810. Once malicious object 882 gains access to client device 810, it may try to perform work such as social engineering of user 820, a hardware-based attack on client device 810, modifying storage 850 (or volatile memory), modifying client application 812 (which may be running in memory), or gaining access to local resources. Furthermore, attacks may be directed at IoT objects. IoT objects can introduce new security challenges, as they may be highly heterogeneous, and in some cases may be designed with minimal or no security considerations. To the extent that these devices have security, it may be added on as an afterthought. Thus, IoT devices may in some cases represent new attack vectors for attacker 880 to leverage against local network 870.

Malicious harm or mischief may take the form of installing root kits or other malware on client devices 810 to tamper with the system, installing spyware or adware to collect personal and commercial data, defacing websites, operating a botnet such as a spam server, or simply to annoy and harass users 820. Thus, one aim of attacker 880 may be to install his malware on one or more client devices 810 or any of the IoT devices described. As used throughout this specification, malicious software ("malware") includes any object configured to provide unwanted results or do unwanted work. In many cases, malware objects will be executable objects, including, by way of nonlimiting examples, viruses, Trojans, zombies, rootkits, backdoors, worms, spyware, adware, ransomware, dialers, payloads, malicious browser helper objects, tracking cookies, loggers, or similar objects designed to take a potentially-unwanted action, including, by way of nonlimiting example, data destruction, data denial, covert data collection, browser hijacking, network proxy or redirection, covert tracking, data logging, keylogging, excessive or deliberate barriers to removal, contact harvesting, and unauthorized self-propagation. In some cases, malware could also include negligently-developed software that causes such results even without specific intent.

In enterprise contexts, attacker 880 may also want to commit industrial or other espionage, such as stealing classified or proprietary data, stealing identities, or gaining unauthorized access to enterprise resources. Thus, attacker's strategy may also include trying to gain physical access to one or more client devices 810 and operating them without authorization, so that an effective security policy may also include provisions for preventing such access.

In another example, a software developer may not explicitly have malicious intent, but may develop software that poses a security risk. For example, a well-known and often-exploited security flaw is the so-called buffer overrun, in which a malicious user is able to enter an overlong string into an input form and thus gain the ability to execute arbitrary instructions or operate with elevated privileges on a computing device. Buffer overruns may be the result, for example, of poor input validation or use of insecure libraries, and in many cases arise in nonobvious contexts. Thus, although not malicious, a developer contributing software to an application repository or programming an IoT device may inadvertently provide attack vectors for attacker 880. Poorly-written applications may also cause inherent problems, such as crashes, data loss, or other undesirable behavior. Because such software may be desirable itself, it may be beneficial for developers to occasionally provide updates or patches that repair vulnerabilities as they become known. However, from a security perspective, these updates and patches are essentially new objects that must themselves be validated.

Local network 870 may contract with or subscribe to a security services provider 890, which may provide security services, updates, antivirus definitions, patches, products, and services. MCAFEE, LLC is a nonlimiting example of such a security services provider that offers comprehensive security and antivirus solutions. In some cases, security services provider 890 may include a threat intelligence capability such as McAfee's GTI database, or similar product. Security services provider 890 may update its threat intelligence database by analyzing new candidate malicious objects as they appear on client networks and characterizing them as malicious or benign.

Other security considerations within security ecosystem 800 may include parents' or employers' desire to protect children or employees from undesirable content, such as pornography, adware, spyware, age-inappropriate content, advocacy for certain political, religious, or social movements, or forums for discussing illegal or dangerous activities, by way of nonlimiting example.

Figure 9:
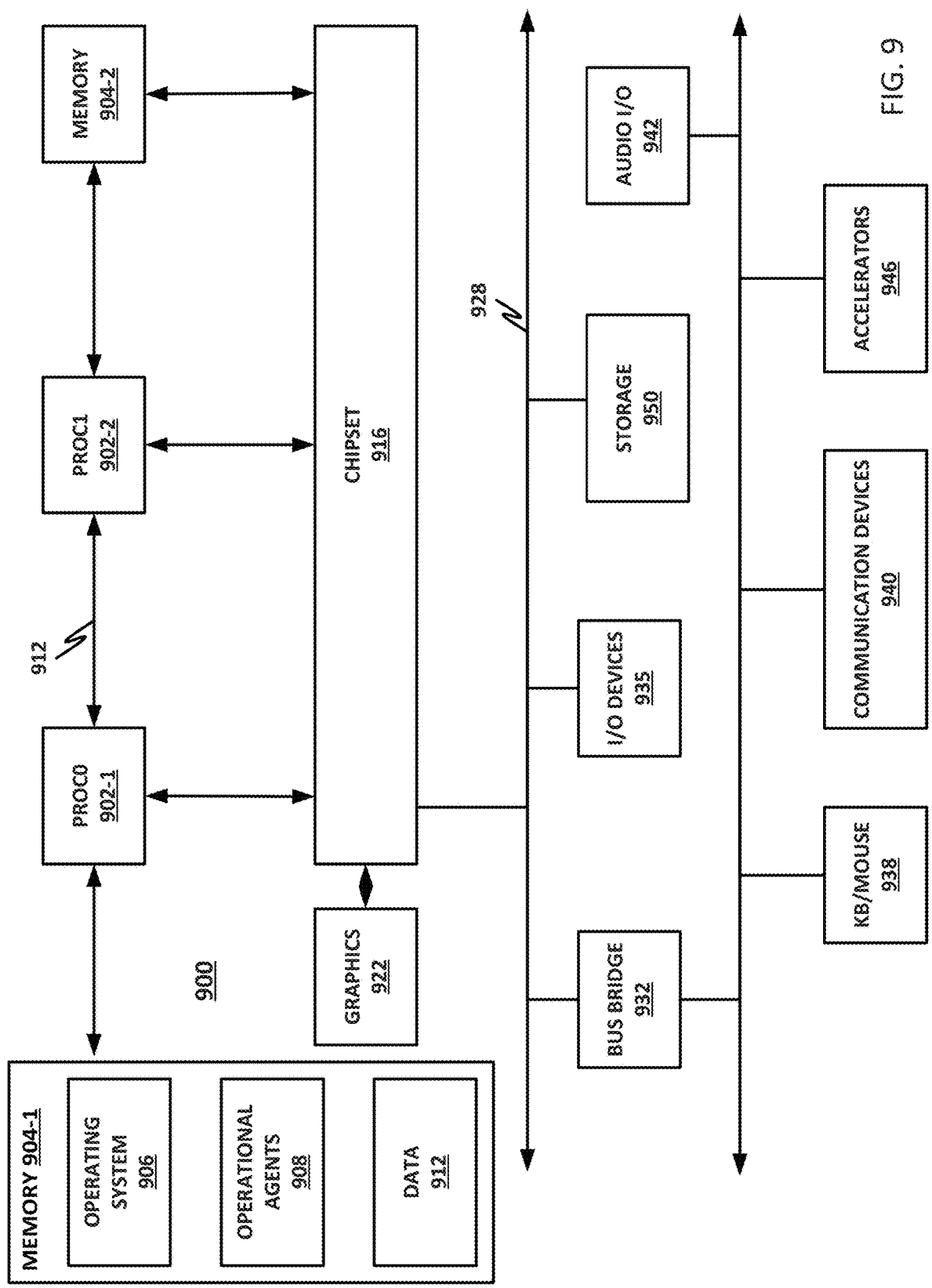
FIG. 9 is a block diagram of selected elements of a hardware platform.

FIG. 9 is a block diagram of a hardware platform 900. Although a particular configuration is illustrated here, there are many different configurations of hardware platforms, and this embodiment is intended to represent the class of hardware platforms that can provide a computing device. Furthermore, the designation of this embodiment as a "hardware platform" is not intended to require that all embodiments provide all elements in hardware. Some of the elements disclosed herein may be provided, in various embodiments, as hardware, software, firmware, microcode, microcode instructions, hardware instructions, hardware or software accelerators, or similar. Furthermore, in some embodiments, entire computing devices or platforms may be virtualized, on a single device, or in a data center where virtualization may span one or a plurality of devices. For example, in a "rackscale architecture" design, disaggregated computing resources may be virtualized into a single instance of a virtual device. In that case, all of the disaggregated resources that are used to build the virtual device may be considered part of hardware platform 900, even though they may be scattered across a data center, or even located in different data centers.

Hardware platform 900 is configured to provide a computing device. In various embodiments, a "computing device" may be or comprise, by way of nonlimiting example, a computer, workstation, server, mainframe, virtual machine (whether emulated or on a "bare-metal" hypervisor), network appliance, container, IoT device, high performance computing (HPC) environment, a data center, a communications service provider infrastructure (e.g., one or more portions of an Evolved Packet Core), an in-memory computing environment, a computing system of a vehicle (e.g., an automobile or airplane), an industrial control system, embedded computer, embedded controller, embedded sensor, personal digital assistant, laptop computer, cellular telephone, internet protocol (IP) telephone, smart phone, tablet computer, convertible tablet computer, computing appliance, receiver, wearable computer, handheld calculator, or any other electronic, microelectronic, or microelectromechanical device for processing and communicating data. At least some of the methods and systems disclosed in this specification may be embodied by or carried out on a computing device.

In the illustrated example, hardware platform 900 is arranged in a point-to-point (PtP) configuration. This PtP configuration is popular for personal computer (PC) and server-type devices, although it is not so limited, and any other bus type may be used.

Hardware platform 900 is an example of a platform that may be used to implement embodiments of the teachings of this specification. For example, instructions could be stored in storage 950. Instructions could also be transmitted to the hardware platform in an ethereal form, such as via a network interface, or retrieved from another source via any suitable interconnect. Once received (from any source), the instructions may be loaded into memory 904, and may then be executed by one or more processor 902 to provide elements such as an operating system 906, operational agents 908, or data 912.

Hardware platform 900 may include several processors 902. For simplicity and clarity, only processors PROC0 902-1 and PROC1 902-2 are shown. Additional processors (such as 2, 4, 8, 16, 24, 32, 64, or 128 processors) may be provided as necessary, while in other embodiments, only one processor may be provided. Details of processors 902 are not illustrated in this FIGURE. Processors may have any number of cores, such as 1, 2, 4, 8, 16, 24, 32, 64, or 128 cores.

Processors 902 may be any type of processor and may communicatively couple to chipset 916 via, for example, PtP interfaces. Chipset 916 may also exchange data with other elements, such as a high-performance graphics adapter 922. In alternative embodiments, any or all of the PtP links illustrated in FIG. 9 could be implemented as any type of bus, or other configuration rather than a PtP link. In various embodiments, chipset 916 may reside on the same die or package as a processor 902 or on one or more different dies or packages. Each chipset may support any suitable number of processors 902. A chipset 916 (which may be a chipset, uncore, Northbridge, Southbridge, or other suitable logic and circuitry) may also include one or more controllers to couple other components to one or more CPUs.

Two memories, 904-1 and 904-2 are shown, connected to PROC0 902-1 and PROC1 902-2, respectively. As an example, each processor is shown connected to its memory in a direct memory access (DMA) configuration, though other memory architectures are possible, including ones in which memory 904 communicates with processor 902 via a bus. For example, some memories may be connected via a system bus, or in a data center, memory may be accessible in a remote DMA (RDMA) configuration.

Memory 904 may include any form of volatile or non-volatile memory including, without limitation, magnetic media (e.g., one or more tape drives), optical media, flash, random access memory (RAM), double data rate RAM (DDR RAM) non-volatile RAM (NVRAM), static RAM (SRAM), dynamic RAM (DRAM), persistent RAM (PRAM), data-centric (DC) persistent memory (e.g., Intel Optane/3D-crosspoint), cache, Layer 1 (L1) or Layer 2 (L2) memory, on-chip memory, registers, virtual memory region, read-only memory (ROM), flash memory, removable media, tape drive, cloud storage, or any other suitable local or remote memory component or components. Memory 904 may be used for short, medium, and/or long-term storage. Memory 904 may store any suitable data or information utilized by platform logic. In some embodiments, memory 904 may also comprise storage for instructions that may be executed by the cores of processors 902 or other processing elements (e.g., logic resident on chipsets 916) to provide functionality.

In certain embodiments, memory 904 may comprise a relatively low-latency volatile main memory, while storage 950 may comprise a relatively higher-latency nonvolatile memory. However, memory 904 and storage 950 need not be physically separate devices, and in some examples may represent simply a logical separation of function (if there is any separation at all). It should also be noted that although DMA is disclosed by way of nonlimiting example, DMA is not the only protocol consistent with this specification, and that other memory architectures are available.

Certain computing devices provide main memory 904 and storage 950, for example, in a single physical memory device, and in other cases, memory 904 and/or storage 950 are functionally distributed across many physical devices. In the case of virtual machines or hypervisors, all or part of a function may be provided in the form of software or firmware running over a virtualization layer to provide the logical function, and resources such as memory, storage, and accelerators may be disaggregated (i.e., located in different physical locations across a data center). In other examples, a device such as a network interface may provide only the minimum hardware interfaces necessary to perform its logical operation and may rely on a software driver to provide additional necessary logic. Thus, each logical block disclosed herein is broadly intended to include one or more logic elements configured and operable for providing the disclosed logical operation of that block. As used throughout this specification, "logic elements" may include hardware, external hardware (digital, analog, or mixed-signal), software, reciprocating software, services, drivers, interfaces, components, modules, algorithms, sensors, components, firmware, hardware instructions, microcode, programmable logic, or objects that can coordinate to achieve a logical operation.

Graphics adapter 922 may be configured to provide a human-readable visual output, such as a command-line interface (CLI) or graphical desktop such as Microsoft Windows, Apple OSX desktop, or a Unix/Linux X Window System-based desktop. Graphics adapter 922 may provide output in any suitable format, such as a coaxial output, composite video, component video, video graphics array (VGA), or digital outputs such as digital visual interface (DVI), FPDLink, DisplayPort, or high definition multimedia interface (HDMI), by way of nonlimiting example. In some examples, graphics adapter 922 may include a hardware graphics card, which may have its own memory and its own graphics processing unit (GPU).

Chipset 916 may be in communication with a bus 928 via an interface circuit. Bus 928 may have one or more devices that communicate over it, such as a bus bridge 932, I/O devices 935, accelerators 946, communication devices 940, and a keyboard and/or mouse 938, by way of nonlimiting example. In general terms, the elements of hardware platform 900 may be coupled together in any suitable manner. For example, a bus may couple any of the components together. A bus may include any known interconnect, such as a multi-drop bus, a mesh interconnect, a fabric, a ring interconnect, a round-robin protocol, a point-to-point interconnect, a serial interconnect, a parallel bus, a coherent (e.g., cache coherent) bus, a layered protocol architecture, a differential bus, or a Gunning transceiver logic (GTL) bus, by way of illustrative and nonlimiting example.

Communication devices 940 can broadly include any communication not covered by a network interface and the various I/O devices described herein. This may include, for example, various USB, FireWire, Lightning, or other serial or parallel devices that provide communications.

I/O Devices 935 may be configured to interface with any auxiliary device that connects to hardware platform 900 but that is not necessarily a part of the core architecture of hardware platform 900. A peripheral may be operable to provide extended functionality to hardware platform 900, and may or may not be wholly dependent on hardware platform 900. In some cases, a peripheral may be a computing device in its own right. Peripherals may include input and output devices such as displays, terminals, printers, keyboards, mice, modems, data ports (e.g., serial, parallel, universal serial bus (USB), Firewire, or similar), network controllers, optical media, external storage, sensors, transducers, actuators, controllers, data acquisition buses, cameras, microphones, speakers, or external storage, by way of nonlimiting example.

In one example, audio I/O 942 may provide an interface for audible sounds, and may include in some examples a hardware sound card. Sound output may be provided in analog (such as a 3.5 mm stereo jack), component ("RCA") stereo, or in a digital audio format such as S/PDIF, AES3, AES47, HDMI, USB, Bluetooth, or Wi-Fi audio, by way of nonlimiting example. Audio input may also be provided via similar interfaces, in an analog or digital form.

Bus bridge 932 may be in communication with other devices such as a keyboard/mouse 938 (or other input devices such as a touch screen, trackball, etc.), communication devices 940 (such as modems, network interface devices, peripheral interfaces such as PCI or PCIe, or other types of communication devices that may communicate through a network), audio I/O 942, and/or accelerators 946. In alternative embodiments, any portions of the bus architectures could be implemented with one or more PtP links.

Operating system 906 may be, for example, Microsoft Windows, Linux, UNIX, Mac OS X, iOS, MS-DOS, or an embedded or real-time operating system (including embedded or real-time flavors of the foregoing). In some embodiments, a hardware platform 900 may function as a host platform for one or more guest systems that invoke application (e.g., operational agents 908).

Operational agents 908 may include one or more computing engines that may include one or more non-transitory computer-readable mediums having stored thereon executable instructions operable to instruct a processor to provide operational functions. At an appropriate time, such as upon booting hardware platform 900 or upon a command from operating system 906 or a user or security administrator, processor 902 may retrieve a copy of the operational agent (or software portions thereof) from storage 950 and load it into memory 904. Processor 902 may then iteratively execute the instructions of operational agents 908 to provide the desired methods or functions.

As used throughout this specification, an "engine" includes any combination of one or more logic elements, of similar or dissimilar species, operable for and configured to perform one or more methods provided by the engine. In some cases, the engine may be or include a special integrated circuit designed to carry out a method or a part thereof, a field-programmable gate array (FPGA) programmed to provide a function, a special hardware or microcode instruction, other programmable logic, and/or software instructions operable to instruct a processor to perform the method. In some cases, the engine may run as a "daemon" process, background process, terminate-and-stay-resident program, a service, system extension, control panel, bootup procedure, basic in/output system (BIOS) subroutine, or any similar program that operates with or without direct user interaction. In certain embodiments, some engines may run with elevated privileges in a "driver space" associated with ring 0, 1, or 2 in a protection ring architecture. The engine may also include other hardware, software, and/or data, including configuration files, registry entries, application programming interfaces (APIs), and interactive or user-mode software by way of nonlimiting example.

Where elements of an engine are embodied in software, computer program instructions may be implemented in programming languages, such as an object code, an assembly language, or a high-level language such as OpenCL, FORTRAN, C, C++, JAVA, or HTML. These may be used with any compatible operating systems or operating environments. Hardware elements may be designed manually, or with a hardware description language such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

A network interface may be provided to communicatively couple hardware platform 900 to a wired or wireless network or fabric. A "network," as used throughout this specification, may include any communicative platform operable to exchange data or information within or between computing devices, including, by way of nonlimiting example, a local network, a switching fabric, an ad-hoc local network, Ethernet (e.g., as defined by the IEEE 802.3 standard), Fibre Channel, InfiniBand, Wi-Fi, or other suitable standard. Intel Omni-Path Architecture (OPA), TrueScale, Ultra Path Interconnect (UPI) (formerly called QPI or KTI), FibreChannel, Ethernet, FibreChannel over Ethernet (FCoE), InfiniBand, PCI, PCIe, fiber optics, millimeter wave guide, an internet architecture, a packet data network (PDN) offering a communications interface or exchange between any two nodes in a system, a local area network (LAN), metropolitan area network (MAN), wide area network (WAN), wireless local area network (WLAN), virtual private network (VPN), intranet, plain old telephone system (POTS), or any other appropriate architecture or system that facilitates communications in a network or telephonic environment, either with or without human interaction or intervention. A network interface may include one or more physical ports that may couple to a cable (e.g., an Ethernet cable, other cable, or waveguide).

In some cases, some or all of the components of hardware platform 900 may be virtualized, in particular the processor(s) and memory. For example, a virtualized environment may run on OS 906, or OS 906 could be replaced with a hypervisor or virtual machine manager. In this configuration, a virtual machine running on hardware platform 900 may virtualize workloads. A virtual machine in this configuration may perform essentially all of the functions of a physical hardware platform.

In a general sense, any suitably-configured processor can execute any type of instructions associated with the data to achieve the operations illustrated in this specification. Any of the processors or cores disclosed herein could transform an element or an article (for example, data) from one state or thing to another state or thing. In another example, some activities outlined herein may be implemented with fixed logic or programmable logic (for example, software and/or computer instructions executed by a processor).

Various components of the system depicted in FIG. 9 may be combined in a system-on-a-chip (SoC) architecture or in any other suitable configuration. For example, embodiments disclosed herein can be incorporated into systems including mobile devices such as smart cellular telephones, tablet computers, personal digital assistants, portable gaming devices, and similar. These mobile devices may be provided with SoC architectures in at least some embodiments. Such an SoC (and any other hardware platform disclosed herein) may include analog, digital, and/or mixed-signal, radio frequency (RF), or similar processing elements. Other embodiments may include a multichip module (MCM), with a plurality of chips located within a single electronic package and configured to interact closely with each other through the electronic package. In various other embodiments, the computing functionalities disclosed herein may be implemented in one or more silicon cores in application-specific integrated circuits (ASICs), field-programmable gate arrays (FPGAs), and other semiconductor chips.

The foregoing outlines features of several embodiments so that those skilled in the art may better understand various aspects of the present disclosure. The embodiments disclosed can readily be used as the basis for designing or modifying other processes and structures to carry out the teachings of the present specification. Any equivalent constructions to those disclosed do not depart from the spirit and scope of the present disclosure. Design considerations may result in substitute arrangements, design choices, device possibilities, hardware configurations, software implementations, and equipment options.

As used throughout this specification, a "memory" is expressly intended to include both a volatile memory and a non-volatile memory. Thus, for example, an "engine" as described above could include instructions stored within a memory that, when executed, instruct a processor to perform the operations of any of the methods or procedures disclosed herein. It is expressly intended that this configuration reads on a computing apparatus "sitting on a shelf" in a non-operational state. For example, in this example, the "memory" could include one or more tangible, non-transitory computer-readable storage media that contain stored instructions. These instructions, in conjunction with the hardware platform (including a processor) on which they are stored may constitute a computing apparatus.

In other embodiments, a computing apparatus may also read on an operating device. For example, in this configuration, the "memory" could include a volatile or run-time memory (e.g., RAM), where instructions have already been loaded. These instructions, when fetched by the processor and executed, may provide methods or procedures as described herein.

In yet another embodiment, there may be one or more tangible, non-transitory computer-readable storage media having stored thereon executable instructions that, when executed, cause a hardware platform or other computing system, to carry out a method or procedure. For example, the instructions could be executable object code, including software instructions executable by a processor. The one or more tangible, non-transitory computer-readable storage media could include, by way of illustrative and non-limiting example, a magnetic media (e.g., hard drive), a flash memory, a read-only memory (ROM), optical media (e.g., CD, DVD, Blu-Ray), non-volatile random access memory (NVRAM), non-volatile memory (NVM) (e.g., Intel 3D Xpoint), or other non-transitory memory.

There are also provided herein certain methods, illustrated for example in flow charts and/or signal flow diagrams. The order or operations disclosed in these methods discloses one illustrative ordering that may be used in some embodiments, but this ordering is no intended to be restrictive, unless expressly stated otherwise. In other embodiments, the operations may be carried out in other logical orders. In general, one operation should be deemed to necessarily precede another only if the first operation provides a result required for the second operation to execute. Furthermore, the sequence of operations itself should be understood to be a non-limiting example. In appropriate embodiments, some operations may be omitted as unnecessary or undesirable. In the same or in different embodiments, other operations not shown may be included in the method to provide additional results.

In certain embodiments, some of the components illustrated herein may be omitted or consolidated. In a general sense, the arrangements depicted in the FIGURES may be more logical in their representations, whereas a physical architecture may include various permutations, combinations, and/or hybrids of these elements.

With the numerous examples provided herein, interaction may be described in terms of two, three, four, or more electrical components. These descriptions are provided for purposes of clarity and example only. Any of the illustrated components, modules, and elements of the FIGURES may be combined in various configurations, all of which fall within the scope of this specification.

In certain cases, it may be easier to describe one or more functionalities by disclosing only selected element. Such elements are selected to illustrate specific information to facilitate the description. The inclusion of an element in the FIGURES is not intended to imply that the element must appear in the invention, as claimed, and the exclusion of certain elements from the FIGURES is not intended to imply that the element is to be excluded from the invention as claimed. Similarly, any methods or flows illustrated herein are provided by way of illustration only. Inclusion or exclusion of operations in such methods or flows should be understood the same as inclusion or exclusion of other elements as described in this paragraph. Where operations are illustrated in a particular order, the order is a nonlimiting example only. Unless expressly specified, the order of operations may be altered to suit a particular embodiment.

Other changes, substitutions, variations, alterations, and modifications will be apparent to those skilled in the art. All such changes, substitutions, variations, alterations, and modifications fall within the scope of this specification.

Example Implementations

The following paragraphs provide various examples of the embodiments disclosed herein.

Example 1 is an apparatus, including a memory element operable to store instructions; and a processor operable to execute the instructions, such that the apparatus is configured to identify sensitive user data stored in the memory by a first application; determine a risk exposure score for the sensitive user data; apply, based on a determination that the risk exposure score is above a threshold, a security policy to restrict access to the sensitive user data; receive a request from a second application to access the sensitive user data;

determine whether the first application and the second application are similar applications; and allow access based on a determination that the first application and the second application are similar applications.

Example 2 may include the subject matter of Example 1, and may be further configured to deny access based on a determination that the first application and the second application are not similar applications.

Example 3 may include the subject matter of any of Examples 1 and 2, and may further specify that the first application and the second application are web browsers.

Example 4 may include the subject matter of any of Examples 1-3, and may further specify that the risk exposure score is determined based on a type of sensitive user data stored and an amount of sensitive user data stored.

Example 5 may include the subject matter of Example 4, and may further specify that the risk exposure score is determined by assigning a risk value to the type of sensitive user data stored and summing the risk values of the sensitive user data.

Example 6 may include the subject matter of any of Examples 1-5, and may further specify that identifying the sensitive user data includes searching unencrypted and encrypted user data stored by the first application.

Example 7 may include the subject matter of any of Examples 1-6, and may further specify that the security policy includes encrypting the sensitive user data.

Example 8 may include the subject matter of any of Examples 1-7, and may be further configured to inspect the sensitive user data; and determine whether to recommend a corrective action.

Example 9 may include the subject matter of Example 8, and may further specify that determining whether to recommend a corrective action includes decrypting the sensitive user data and identifying whether a first password and a second password are a same password.

Example 10 may include the subject matter of Example 8, and may further specify that determining whether to recommend a corrective action includes identifying that a password has not been changed within a defined time period.

Example 11 may include the subject matter of any of Examples 1-10, and may be further configured to determine whether the second application is a valid application.

Example 12 is at least one non-transitory computer-readable medium including one or more instructions that when executed by a processor, cause the processor to identify sensitive user data stored, by a first application, in memory on an electronic device; determine a risk exposure score for the sensitive user data; apply, based on a determination that the risk exposure score is above a threshold, a security policy to restrict access to the sensitive user data; receive a request from a second application to access the sensitive user data; determine whether the first application and the second application are similar applications; and deny access based on a determination that the first application and the second application are not similar applications.

Example 13 may include the subject matter of Example 12, and may further include one or more instructions that when executed by a processor, cause the processor to notify a user of the request by the second application to access the sensitive user data.

Example 14 may include the subject matter of any of Examples 12 and 13, and may further include one or more instructions that when executed by a processor, cause the processor to send, to a cloud server, data associated with the request by the second application to access the sensitive user data for processing to identify whether the second application includes malware; receive, from the cloud server, processed data identifying whether the second application includes malware; identify, based on a determination that the second application includes malware, a corrective action; and prompt a user to take the corrective action.

Example 15 may include the subject matter of Example 14, and may further specify that the corrective action includes one or more of: deleting sensitive user data stored locally by the first application, deleting the second application, scanning the electronic device with anti-malware software, changing a password, improving a strength of a password, and making all passwords unique.

Example 16 may include the subject matter of Example 14, and may further include one or more instructions that when executed by a processor, cause the processor to: determine whether the corrective action has been taken within a defined time period; and re-prompt, based on a determination that the corrective action has not been taken within the defined time period, the user to take the corrective action.

Example 17 is a method, including: analyzing a user's digital profile on an electronic device; determining whether a corrective action is recommended; and prompting, based on a determination that the corrective action is recommended, a user to take the corrective action.

Example 18 may include the subject matter of Example 17, and may further specify that analyzing the user's digital profile includes identifying the user's online browsing history, bookmarks, frequently visited websites, favorite websites, and online purchasing history.

Example 19 may include the subject matter of Example 17, and may further specify that analyzing the user's digital profile includes comparing a user's passwords across different login accounts and assigning a password similarity score to the user's passwords.

Example 20 may include the subject matter of Example 17, and may further specify that analyzing the user's digital profile includes identifying sensitive user data stored locally by an application and assigning a risk exposure score.

The invention claimed is:

1. An apparatus, comprising:
a memory element operable to store instructions; and
a processor operable to execute the instructions, such that the apparatus is configured to:
identify sensitive user data stored in the memory by a first application by searching unencrypted and encrypted user data stored by the first application, wherein the first application is a web based application or a web browser;
determine a risk exposure score for the sensitive user data;
apply, based on a determination that the risk exposure score is above a threshold, a security policy to restrict access to the sensitive user data;
receive a request from a second application to access the sensitive user data;
determine whether the first application and the second application are similar applications; and
allow access based on a determination that the first application and the second application are similar applications.

2. The apparatus of claim 1, further configured to:
deny access based on a determination that the first application and the second application are not similar applications.

3. The apparatus of claim 1, wherein the first application and the second application are web browsers.

4. The apparatus of claim 1, wherein the risk exposure score is determined based on a type of sensitive user data stored and an amount of sensitive user data stored.

5. The apparatus of claim 4, wherein the risk exposure score is determined by assigning a risk value to the type of sensitive user data stored and summing the risk values of the sensitive user data.

6. The apparatus of claim 1, wherein the security policy includes encrypting the sensitive user data.

7. The apparatus of claim 1, further configured to:
inspect the sensitive user data; and
determine whether to recommend a corrective action.

8. The apparatus of claim 7, wherein determining whether to recommend a corrective action includes decrypting the sensitive user data and identifying whether a first password and a second password are a same password.

9. The apparatus of claim 7, wherein determining whether to recommend a corrective action includes identifying that a password has not been changed within a defined time period.

10. The apparatus of claim 1, further configured to:
determine whether the second application is a valid application.

11. The apparatus of claim 1, wherein the encrypted user data is decrypted before it is searched.

12. At least one non-transitory computer-readable medium comprising one or more instructions that when executed by a processor, cause the processor to:
identify sensitive user data stored, by a first application, in memory on an electronic device by searching unencrypted and encrypted user data stored by the first application, wherein the first application is a web based application or a web browse;
determine a risk exposure score for the sensitive user data;
apply, based on a determination that the risk exposure score is above a threshold, a security policy to restrict access to the sensitive user data;
receive a request from a second application to access the sensitive user data;
determine whether the first application and the second application are similar applications; and
deny access based on a determination that the first application and the second application are not similar applications.

13. The at least one non-transitory computer-readable medium of claim 12, further comprising one or more instructions that when executed by a processor, cause the processor to:
notify a user of the request by the second application to access the sensitive user data.

14. The at least one non-transitory computer-readable medium of claim 12, further comprising one or more instructions that when executed by a processor, cause the processor to:
send, to a cloud server, data associated with the request by the second application to access the sensitive user data for processing to identify whether the second application includes malware;
receive, from the cloud server, processed data identifying whether the second application includes malware;
identify, based on a determination that the second application includes malware, a corrective action; and
prompt a user to take the corrective action.

15. The at least one non-transitory computer-readable medium of claim 14, wherein the corrective action includes one or more of: deleting sensitive user data stored locally by the first application, deleting the second application, scanning the electronic device with anti-malware software, changing a password, improving a strength of a password, and making all passwords unique.

16. The at least one non-transitory computer-readable medium of claim 14, further comprising one or more instructions that when executed by a processor, cause the processor to:
determine whether the corrective action has been taken within a defined time period; and
re-prompt, based on a determination that the corrective action has not been taken within the defined time period, the user to take the corrective action.

17. A method, comprising:
searching unencrypted and encrypted user data stored in memory of an electronic device by a first application, wherein the application is a web based application or a web browser;
identifying sensitive user data stored in the memory by the application;
determining a risk exposure score for the sensitive user data;
receiving a request from a second application to access the sensitive user data;
determining whether the first application and the second application are similar applications; and
allowing access based on a determination that the first application and the second application are similar applications.

18. The method of claim 17, further configured to:
denying access based on a determination that the first application and the second application are not similar applications.

19. The method of claim 17, wherein the first application and the second application are web browsers.

20. The method of claim 17, further comprising:
applying, based on a determination that the risk exposure score is above a threshold, a security policy to restrict access to the sensitive user data.

21. The method of claim 20, wherein the security policy includes encrypting the sensitive user data.

* * * * *

UNITED STATES PATENT AND TRADEMARK OFFICE
CERTIFICATE OF CORRECTION

PATENT NO. : 11,610,020 B2
APPLICATION NO. : 16/887676
DATED : March 21, 2023
INVENTOR(S) : Shashank Jain et al.

It is certified that error appears in the above-identified patent and that said Letters Patent is hereby corrected as shown below:

On the Title Page

In Item (71), under "Applicant", Line 1, delete "Santa Clara," and insert -- San Jose, --, therefor.

In the Claims

In Column 25, Line 32, in Claim 12, delete "web browse;" and insert -- web browser; --, therefor.

Signed and Sealed this
Ninth Day of May, 2023

Katherine Kelly Vidal
*Director of the United States Patent and Trademark Office*